(12) United States Patent
Iwashita et al.

(10) Patent No.: US 8,432,120 B2
(45) Date of Patent: Apr. 30, 2013

(54) TOOL PATH DISPLAY APPARATUS WITH DECELERATION FACTOR IDENTIFICATION MEANS FOR MACHINE TOOL

(75) Inventors: Yasusuke Iwashita, Yamanashi (JP); Tadashi Okita, Yamanashi (JP); Junichi Tezuka, Yamanashi (JP)

(73) Assignee: Fanuc Corporation (JP)

( * ) Notice: Subject to any disclaimer, the term of this patent is extended or adjusted under 35 U.S.C. 154(b) by 156 days.

(21) Appl. No.: 13/117,731

(22) Filed: May 27, 2011

(65) Prior Publication Data
US 2012/0007536 A1  Jan. 12, 2012

(30) Foreign Application Priority Data
Jul. 12, 2010  (JP) .................................. 2010-158186

(51) Int. Cl.
G05B 19/25  (2006.01)
(52) U.S. Cl.
USPC ......................................... 318/569; 318/573
(58) Field of Classification Search .................. 318/560, 318/567, 569, 570, 573, 574, 600
See application file for complete search history.

(56) References Cited

U.S. PATENT DOCUMENTS

| | | | | |
|---|---|---|---|---|
| 4,633,409 A | * | 12/1986 | Sekikawa | 700/183 |
| 4,912,625 A | * | 3/1990 | Glatfelter | 700/87 |
| 6,338,003 B1 | * | 1/2002 | Kamiguchi et al. | 700/169 |
| 6,539,275 B1 | | 3/2003 | Mizuno et al. | |
| 8,010,302 B2 | * | 8/2011 | Okita et al. | 702/41 |
| 8,190,287 B2 | * | 5/2012 | Iwashita et al. | 700/182 |

FOREIGN PATENT DOCUMENTS

| | | | |
|---|---|---|---|
| JP | 2236603 A | 8/1990 | |
| JP | 9319419 A | 12/1997 | |
| JP | 11104935 A | 4/1999 | |
| JP | 11-338530 A | 12/1999 | |

OTHER PUBLICATIONS

Notification of Reasons for Refusal for JP2010-158186 dated Sep. 20, 2011.

\* cited by examiner

*Primary Examiner* — Bentsu Ro
(74) *Attorney, Agent, or Firm* — Lowe Hauptman Ham & Berner, LLP

(57) ABSTRACT

A numerical controller calculates a first position command from a machining program, converts the first position command into a second position command for restricting a tangential speed of a tool, and delivers the second position command and a status signal indicative of the achievement of the conversion of the first position command into the second position command to a tool path display apparatus. The tool path display apparatus displays the path of the tool in a color corresponding to the status signal and can thereby determine the point on the tool path at which the speed restriction is performed.

3 Claims, 8 Drawing Sheets

TOOL PATH DISPLAY APPARATUS WITH DECELERATION FACTOR IDENTIFICATION MEANS FOR MACHINE TOOL

RELATED APPLICATIONS

The present application is based on, and claims priority from, Japanese Application Number 2010-158186, filed Jul. 12, 2010, the disclosure of which is hereby incorporated by reference herein in its entirety.

BACKGROUND OF THE INVENTION

1. Field of the Invention

The present invention relates to a tool path display apparatus with deceleration factor identification means for a machine tool.

2. Description of the Related Art

In executing a machining program to machine a workpiece, a tool center point moves at a commanded speed (tangential speed) on a commanded path. However, the tool center point does not always move at the commanded speed, and the speed may be restricted under various conditions depending on the place.

Some machine tool controllers have, for example, a function to restrict the speed of the tool center point so that a speed difference between blocks is not greater than a tolerance that ensures precision machining near corner portions or to restrict the speed so that acceleration for each axis is not higher than a tolerance.

Japanese Patent Application Laid-Open No. 11-338530 discloses a technique of a controller for a machine tool comprising a plurality of drive axes, which controls the tangential speed of a tool based on a maximum allowable acceleration set for each axis.

Conventionally, processing for restricting the speed of a tool center point has been performed under various conditions. It is difficult, however, to determine the condition under which the speed is restricted at each point on a tool path. In Japanese Patent Application Laid-Open No. 11-338530, there is no description of a method for displaying the correspondence between a point on the tool path and the speed restriction.

SUMMARY OF THE INVENTION

Accordingly, the object of the present invention is to provide a tool path display apparatus for a machine tool with a numerical controller, enabling to easily determine the condition under which the speed of a tool center point is restricted at each point on a tool path while processing for restricting the speed is being performed under various conditions.

In a tool path display apparatus for a machine tool with a numerical controller according to the present invention, the machine tool is configured to machine a workpiece by means of a plurality of drive axes, and the numerical controller is configured to control relative positions and postures of a tool and the workpiece. The numerical controller comprises a first position command calculation unit which calculates a first position command of each of the drive axes based on a path shape and a tangential speed of the tool commanded by a machining program, a second position command calculation unit which restricts the tangential speed of the tool so as to satisfy a previously specified condition and converts the first position command into a second position command based on the restricted speed, a status signal output unit which outputs a status signal indicative of the achievement of the restriction of the tangential speed of the tool so as to satisfy the previously specified condition and the conversion of the first position command into the second position command based on the restricted speed, and a drive axis control unit which controls the respective drive axes in motion in response to the second position command for the drive axes. Further, the tool path display apparatus comprises a tool command position coordinate calculation unit which calculates two- or three-dimensional coordinate values of a tool command position as viewed from a coordinate system fixed to the workpiece, based on the second position command for each drive axis of the machine tool at each time and information on a machine configuration of the machine tool, a display color command unit which commands a display color corresponding to the status signal output from the status signal output unit, and a tool path display unit which displays a two- or three-dimensional path of the tool in the display color commanded by the display color command unit, based on the coordinate values of the tool command position calculated by the tool command position coordinate calculation unit. The achievement of the speed restriction on the tool can be determined by the color display at each point on a tool path.

The second position command calculation unit may prepare a plurality of conditions for the speed restriction in advance, restrict the tangential speed of the tool so as to satisfy all the conditions, and convert the first position command into the second position command based on the restricted speed. The status signal output unit may restrict the tangential speed of the tool under one of the conditions and output status signals indicative of the achievement of the conversion of the first position command into the second position command, corresponding individually to the conditions. The display color command unit may previously set display colors which correspond individually to the conditions, previously set the order of priority of the status signals output from the status signal output unit, and command the display colors in the set order of priority. Thus, the condition under which the speed restriction on the tool is achieved can be determined by the color display at each point on the tool path.

The numerical controller may further comprise a tangential speed output unit which restricts the tangential speed of the tool so as to satisfy the previously specified condition and outputs the restricted tangential speed, and the tool path display apparatus may further comprise a waveform display unit which simultaneously acquires a tangential speed and a status signal at each time and displays the acquired tangential speed and the status signal in waveforms, individually.

The tool path display apparatus may further comprise an actual tool position coordinate calculation unit which calculates two or three-dimensional coordinate values of the tool as viewed from the coordinate system fixed to the workpiece, based on an actual position of each drive axis of the machine tool at each time and the information on the machine configuration, a path error calculation unit which calculates a path error of the tool based on the tool command position coordinate values calculated by the tool command position coordinate calculation unit, and the actual tool position coordinate values calculated by the actual tool position coordinate calculation unit, and a waveform display unit which simultaneously displays the tangential speed, the status signal, and the path error at the same time in waveforms, individually.

According to the present invention, there may be provided a tool path display apparatus which enables easily to determine the condition under which the speed of a tool center point is restricted at each point on a tool path while processing for restricting the speed is being performed under various conditions.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
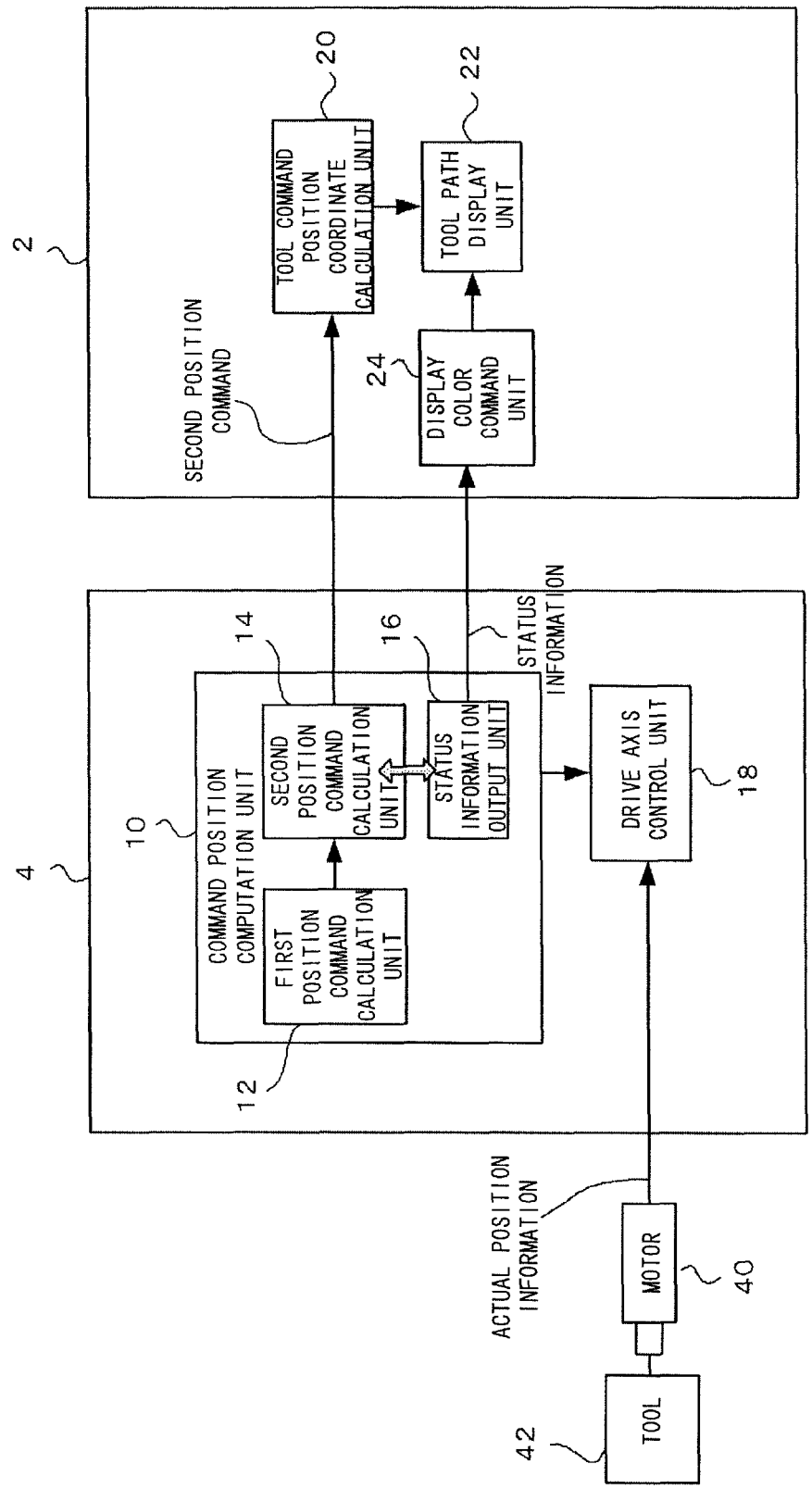
FIG. 1 is a diagram illustrating a first embodiment of a tool path display apparatus according to the present invention.

FIG. 1 is a diagram illustrating a first embodiment of a tool path display apparatus according to the present invention.

A numerical controller 4 controls a plurality of drive axes of a machine tool in accordance with a machining program and controls the relative positions and postures of a tool relative to a workpiece, thereby enabling the machine tool to machine the workpiece. The numerical controller 4 comprises a command position computation unit 10 and a drive axis control unit 18. The command position computation unit 10 includes a first position command calculation unit 12 configured to calculate a first position command, second position command calculation unit 14 configured to calculate a second position command from the first position command, and status information output unit 16.

The first position command calculation unit 12 calculates the first position command for a position where a tool 42 is to be located at each time for each drive axis, based on the path shape and tangential speed of the tool 42 commanded by the machining program. The second position command calculation unit 14 restricts the tangential speed of the tool so as to satisfy previously specified conditions, converts the first position command into a second position command in accordance with the restricted tangential speed, and outputs the second position command to a tool command position coordinate calculation unit 20. The computation of the second position command based on the first position command is processing that has conventionally been performed in numerical controllers for controlling machine tools.

The status information output unit 16 outputs a status signal to a display color command unit 24 of a tool path display apparatus 2. The status signal indicates that the tangential speed of the tool is restricted so as to satisfy the conditions previously specified in the second position command calculation unit 14. The drive axis control unit 18 drives a motor 40 in response to the second position command for each drive axis and controls the position and posture of the tool 42 through a drive axis (not shown).

The tool path display apparatus 2 comprises the tool command position coordinate calculation unit 20, a tool path display unit 22, and the display color command unit 24. The tool command position coordinate calculation unit 20 acquires the second position command from the second position command calculation unit 14 of the numerical controller 4 and calculates tool command position coordinates as viewed from a coordinate system fixed to the workpiece, based on the acquired second position command and information on the machine configuration of the machine tool.

The display color command unit 24 acquires status information, which indicates that the tangential speed of the tool is restricted according to deceleration conditions, from the status information output unit 16. The display color command unit 24 outputs display color information, which is previously set for each piece of status information corresponding to the conditions, to the tool path display unit 22. Further, the deceleration condition for the display color to be preferentially output to the tool path display unit 22, in the case of deceleration under the deceleration conditions, is previously set in the display color command unit 24. The preferential display color may be varied by setting.

Figure 2:
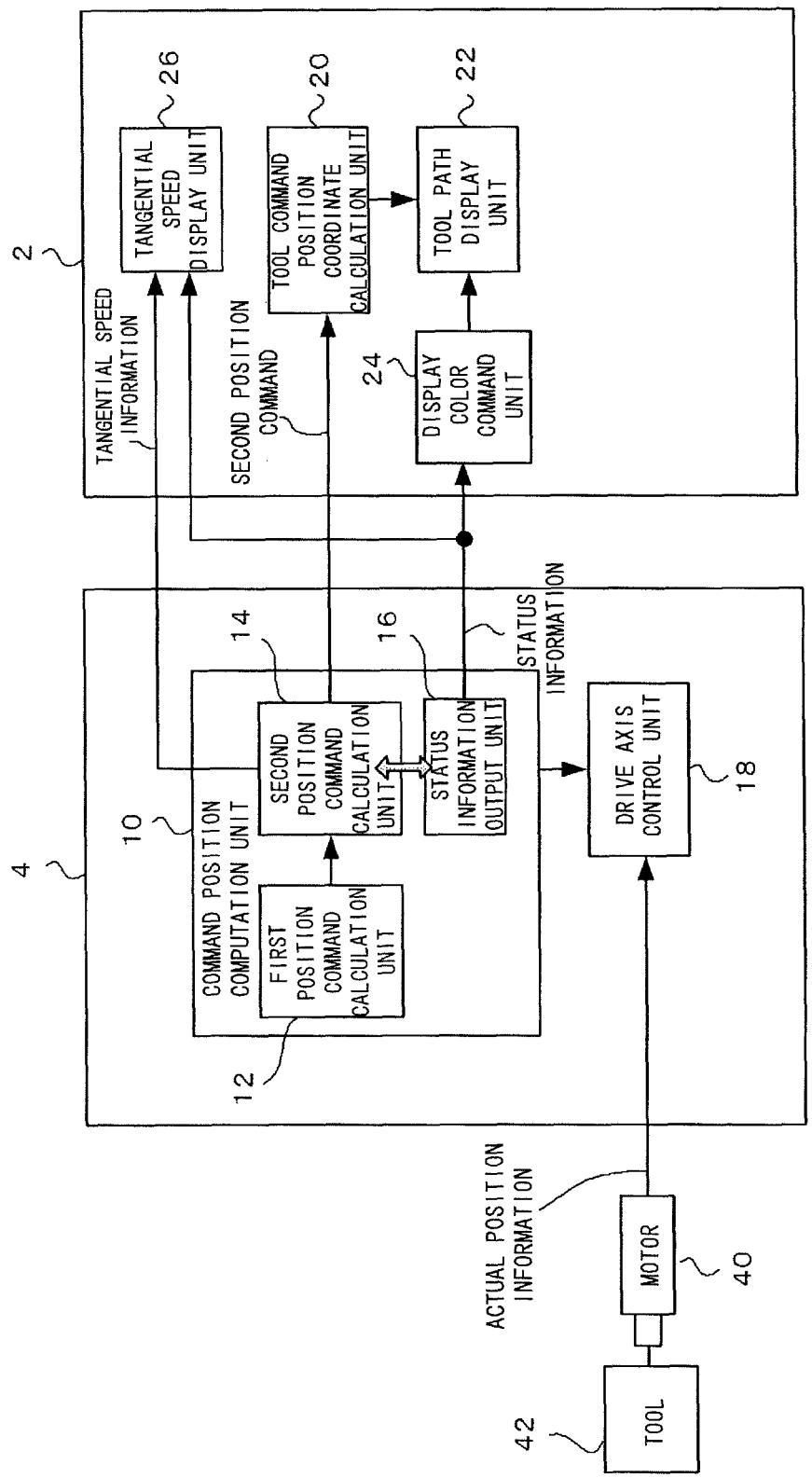
FIG. 2 is a diagram illustrating a second embodiment of the tool path display apparatus according to the present invention, which displays a tangential speed.

FIG. 2 is a diagram illustrating a second embodiment of the tool path display apparatus according to the present invention, which displays the tangential speed. The tool path display apparatus 2 of this embodiment further comprises a tangential speed display unit 26.

Referring to FIG. 1, the second position command calculation unit 14 calculates restricted tangential speed information on the tool 42 as it calculates the second position command, and outputs the calculated information to the tangential speed display unit 26. The tangential speed display unit 26 may display the received tangential speed information on the tool 42 in waveforms, as described with reference to FIGS. 7 and 8. Further, the tangential speed display unit 26 can simultaneously display the tangential speed and status information on receiving the status information corresponding to the deceleration conditions from the status information output unit 16.

Figure 3:
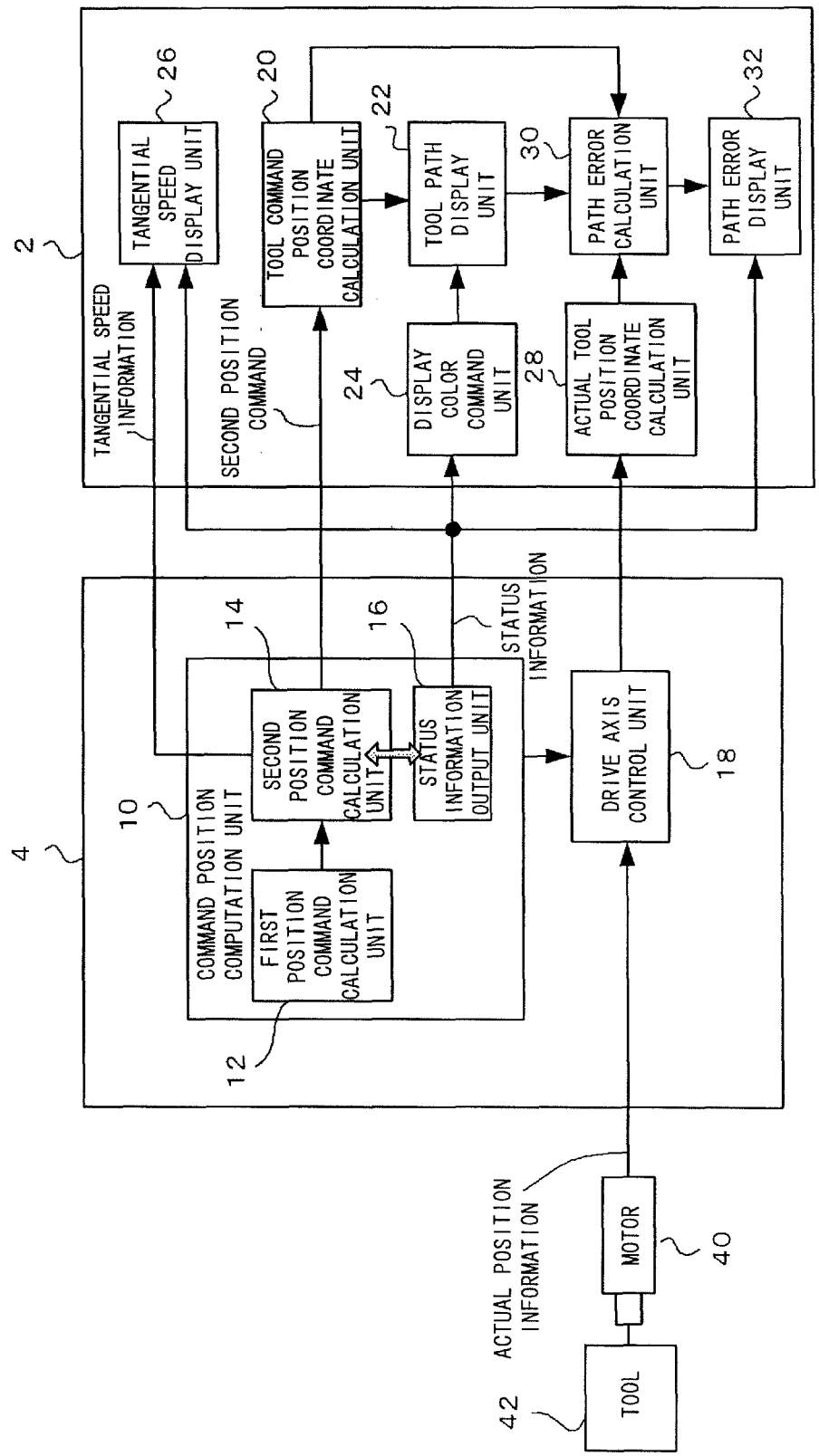
FIG. 3 is a diagram illustrating a third embodiment of the tool path display apparatus according to the present invention, which displays a path error.

FIG. 3 is a diagram illustrating a third embodiment of the tool path display apparatus according to the present invention, which displays a path error. The tool path display apparatus 2 of this embodiment further comprises an actual tool position coordinate calculation unit 28, path error calculation unit 30, and path error display unit 32.

The actual tool position coordinate calculation unit 28 acquires, through the drive axis control unit 18, actual position information detected by an encoder (not shown) attached to the motor 40. Further, the actual tool position coordinate calculation unit 28 calculates two- or three-dimensional coordinate values of the tool as viewed from the coordinate system fixed to the workpiece, based on the actual position of each drive axis of the machine tool at each time and machine configuration information The path error calculation unit 30 calculates a path error of the tool 42 based on tool command position coordinate values calculated by the tool command position coordinate calculation unit 20 and actual tool position coordinate values calculated by the actual tool position coordinate calculation unit 28. The path error display unit 32 displays, in waveforms, status information input from the status information output unit 16, along with the path error calculated by the path error calculation unit 30.

Figure 4:
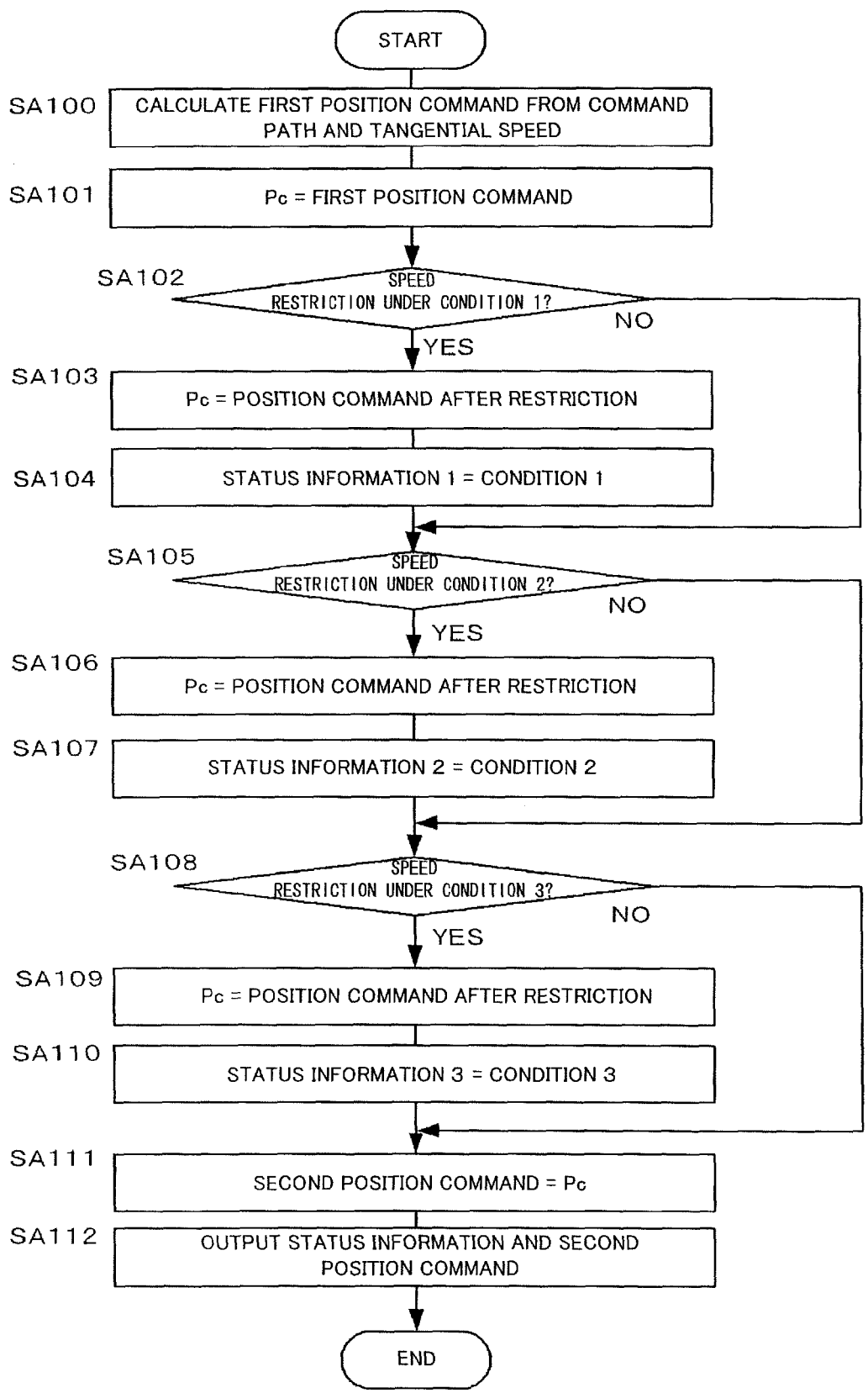
FIG. 4 is a flowchart illustrating an algorithm of processing for deceleration factor identification performed by the tool path display apparatus of the present invention.

FIG. 4 is a flowchart illustrating an algorithm of processing for deceleration factor identification performed by the tool path display apparatus of the present invention. The following is a description of steps of this processing.

[Step SA100] The first position command is calculated from a command path and tangential speed.

[Step SA101] The first position command calculated in Step SA100 is substituted for Pc.

[Step SA102] It is determined whether or not the speed restriction is based on condition 1. If the restriction is based on condition 1, the program proceeds to Step SA103. If not, the program proceeds to Step SA105.

[Step SA103] The position command obtained after the restriction under condition 1 is substituted for Pc.

[Step SA104] Status information 1 is defined as information indicative of the achievement of the restriction under condition 1.

[Step SA105] It is determined whether or not the speed restriction is based on condition 2. If the restriction is based on condition 2, the program proceeds to Step SA106. If not, the program proceeds to Step SA108.

[Step SA106] The position command obtained after the restriction under condition 2 is substituted for Pc.

[Step SA107] Status information 2 is defined as information indicative of the achievement of the restriction under condition 2.

[Step SA108] It is determined whether or not the speed restriction is based on condition 3. If the restriction is based on condition 3, the program proceeds to Step SA109. If not, the program proceeds to Step SA111.

[Step SA109] The position command obtained after the restriction under condition 3 is substituted for Pc.

[Step SA110] Status information 3 is defined as information indicative of the achievement of the restriction under condition 3.

[Step SA111] Pc is set as the second position command.

[Step SA112] The status information and the second position command are output, whereupon the processing terminates.

The above flowchart will be supplemented. For example, condition 1 is assumed to be corner deceleration; condition 2, restriction by acceleration; and condition 3, restriction by jerk. Restrictive conditions to be used individually as conditions 1 to 3 and their setting order may be made suitably selectable. The number of conditions is not limited to three and may alternatively be one, two, or four or more.

The corner deceleration or the restriction by acceleration will, now be described with reference to FIGS. 5 and 6.

Figure 5:
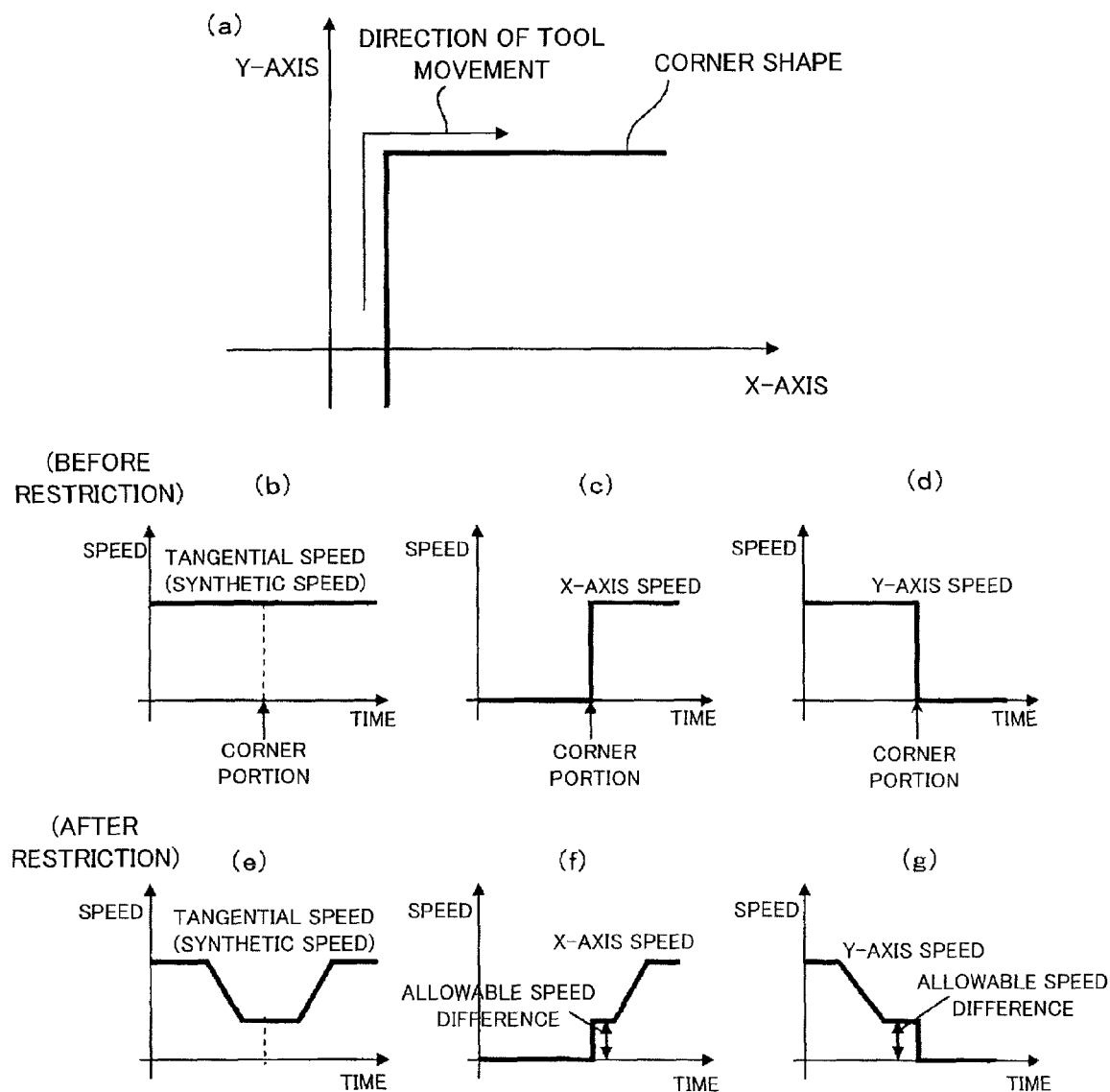
FIG. 5 shows diagrams illustrating corner deceleration as one of conditions for speed restriction.

FIG. 5 shown diagrams illustrating the corner deceleration as one of conditions for speed restriction, in which (a) shows an example of a corner shape, (b) is a graph showing the relationship between time and the tangential speed (synthetic speed) before restriction, (c) is a graph showing the relationship between time and the X-axis speed before restriction, (d) is a graph showing the relationship between time and the Y-axis speed before restriction, (a) is a graph showing the relationship between time and the tangential speed (synthetic speed) after restriction, (f) is a graph showing the relationship between time and the X-axis speed after restriction, and (g) is a graph showing the relationship between time and the Y-axis speed after restriction.

Let us suppose a command for the movement of a path with the corner shape shown in (a) of FIG. 5 at a constant tangential speed (see (b) in FIG. 5).

The respective speeds of X- and Y-axes as drive axes need to make stepped changes at a corner portion (see (c) and (d) of FIG. 5). If the speed changes of the X- and Y-axes at the corner portion are greater than a predetermined level, the command is restricted so as to reduce the tangential speed (synthetic speed) at the corner portion to a certain level (see (a) of FIG. 5). Then, a tangential speed is calculated such that the speed changes of the X- and Y-axes at the corner portion are less than an allowable speed difference, and a command is calculated such that the tangential speed is reduced to the calculated speed. As a result of the reduction of the tangential speed, the X- and Y-axis speeds behave in the manners shown in (f) and (g) of FIG. 5, respectively.

Figure 6:
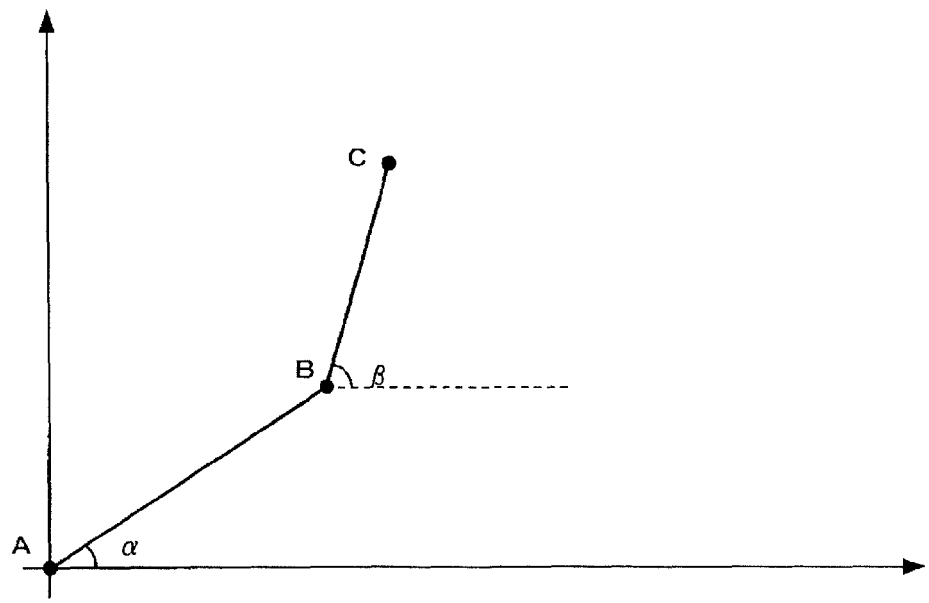
FIG. 6 is a diagram illustrating restriction by acceleration as one of the conditions for speed restriction.

FIG. 6 is a diagram illustrating the restriction by acceleration as one of the conditions for speed restriction.

Even if the tangential acceleration of a point on the path is constant, the magnitude of the acceleration of each axis (e.g., X or Y-axis) changes depending on the direction of advance. For example, both tangential accelerations between points A and B and between points B and C are assumed to be a, an angle between a vector AB and the X-axis is assumed to be $\alpha$, and an angle between a vector BC and the X-axis is assumed to be $\beta$. Given this, we obtain (X-direction acceleration between A and B)=a·cos $\alpha$ and (X-direction acceleration between B and C)=a·cos $\beta$.

If the respective accelerations of the axes exceed predetermined limit values, the tangential acceleration is restricted so that the axis accelerations are not higher than the limit values.

Figure 7:
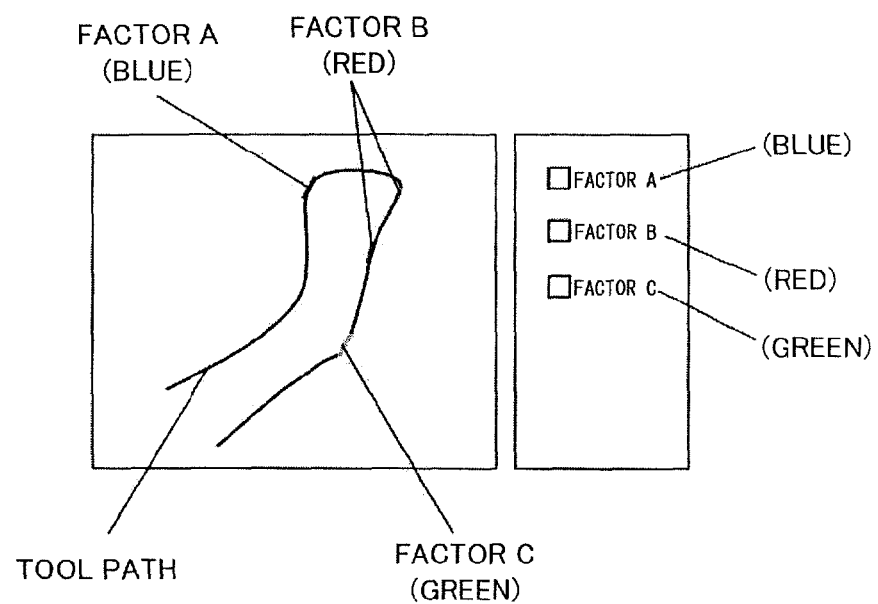
FIG. 7 is a diagram illustrating how different display colors are set for individual deceleration factors so that only those parts which satisfy the conditions at each point on the tool path can be displayed in colors corresponding to the factors.

FIG. 7 is a diagram illustrating how different display colors are set for individual deceleration factors so that only those parts which satisfy the conditions at each point on the tool path can be displayed in colors corresponding to the factors.

As shown in FIG. 4, whether or not the deceleration conditions are satisfied is determined for each deceleration factor. If the conditions are satisfied, "status signal=1" is output. If not, "status signal=0" is output. As shown in FIG. 7, the achievement of speed restriction can be easily identified at each point on the tool path by displaying only the part corresponding to "status signal=1" at each point in a display color corresponding to the factor.

Figure 8:
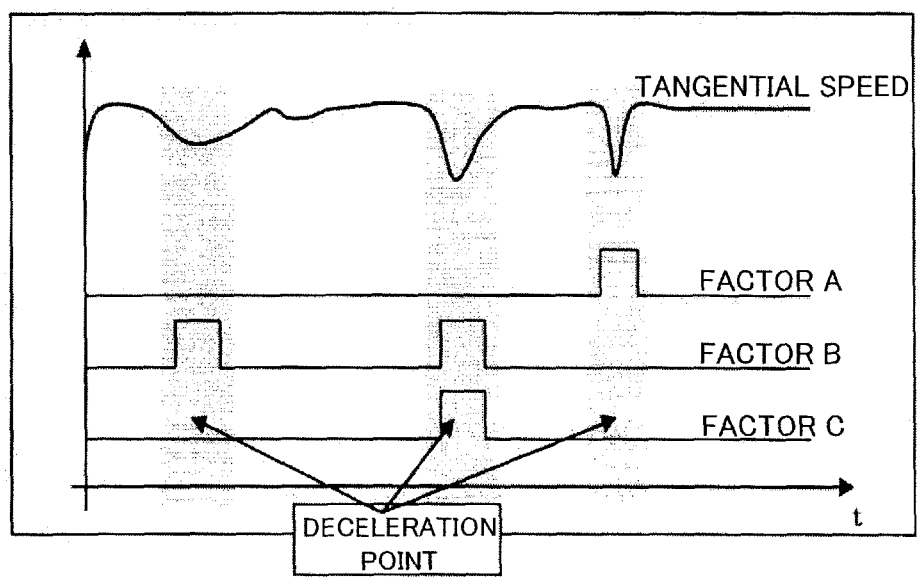
FIG. 8 is a diagram illustrating how the tangential speed and states of establishment of the factors are displayed in graphs the abscissa of which represents time.

FIG. 8 is a diagram illustrating how the tangential speed and the states of establishment of the factors are displayed in graphs the abscissa of which represents time.

The correspondence between the deceleration factors and the then tangential speed can be made easily understandable by concurrently displaying the tangential speed and status signals for the establishment of factors A, B and C in a graph the abscissa of which represents time t, not in a graph for the tool path.

Figure 9:
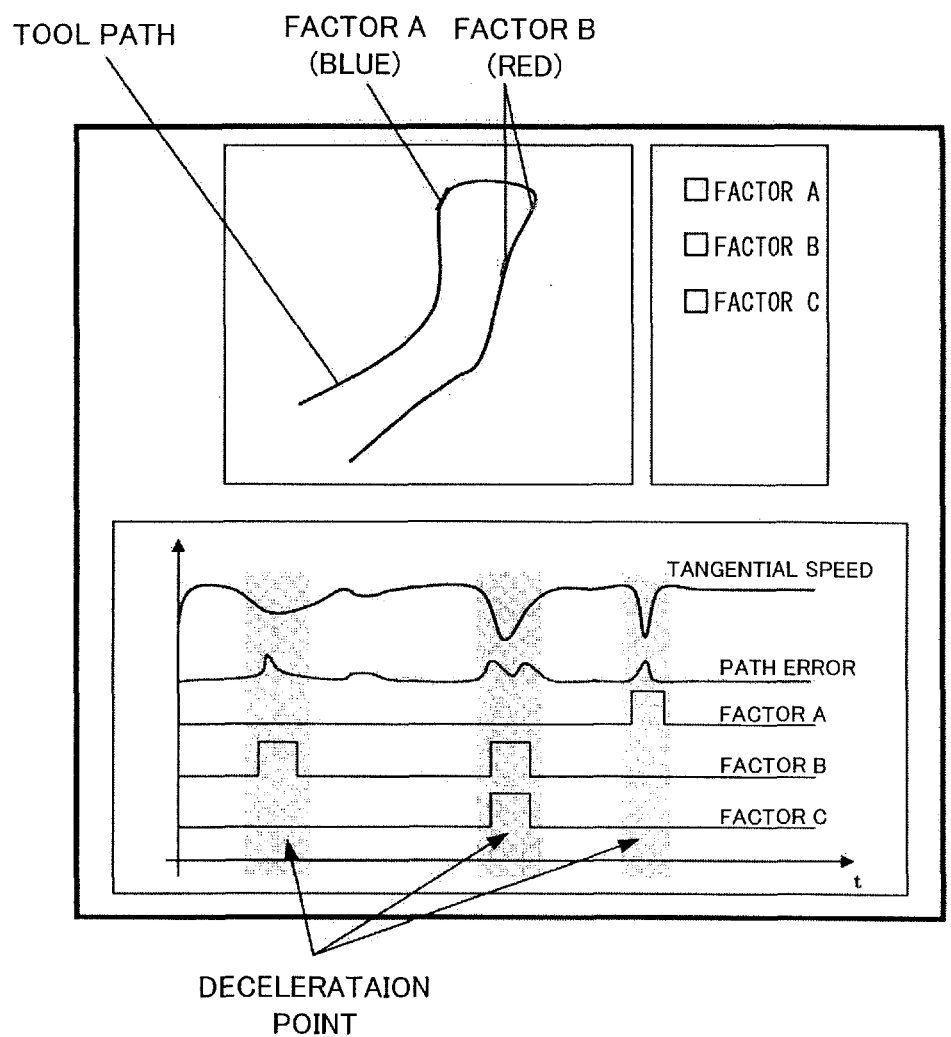
FIG. 9 is a diagram illustrating how a tool path waveform and time-based waveforms of the tangential speed, path error, and status signals are displayed in a single viewing area.

FIG. 9 is a diagram illustrating how the tool path waveform and time-based waveforms of the tangential speed, path error, and status signals are displayed in a single viewing area.

The tool path waveform and the time-based waveforms of the tangential speed, status signals, etc., are simultaneously displayed in the single viewing area so that a point on the tool path and the tangential speed at the point can be identified. While the deceleration is illustrated as being based on the factors B and C in this drawing, the display color for the tool path is selectable with priority on the factor B. The speed can be appropriately regulated by adjusting corresponding (condition setting) parameters in accordance with the conditions for speed restriction. By concurrently displaying the path error waveform, moreover, the parameters for restricting the tangential speed can be efficiently adjusted so that minimum necessary deceleration is performed to reduce the path error to a target value or less.

The following is a description of an outline of a method for obtaining the path error waveform. Position command data and actual position data are acquired at discrete times. A command segment that connects two adjacent points with respect to each position command point is defined, and the path error can be obtained by calculating, as an actual position error with respect to the command path, the shortest one of perpendicular lines from actual positions at individual times to the aforementioned command segment and a segment that connects the actual position and a command position based on position command data nearest to the actual position, whichever is shorter.

The invention claimed is:

1. A tool path display apparatus for a machine tool with a numerical controller which controls relative positions and postures of a tool and a workpiece to machine the workpiece by means of a plurality of drive axes, comprising:
   a first position command calculation unit which calculates a first position command of each of the drive axes based on a path shape and a tangential speed of the tool commanded by a machining program;
   a second position command calculation unit which restricts the tangential speed of the tool so as to satisfy a previously specified condition and converts the first position command into a second position command based on the restricted speed;
   a status information output unit which outputs a status information indicative of the achievement of the restriction of the tangential speed of the tool so as to satisfy the previously specified condition and the conversion of the first position command into the second position command based on the restricted speed;
   a drive axis control unit which controls the respective drive axes in motion in response to the second position command for the drive axes;
   a tool command position coordinate calculation unit which calculates two- or three-dimensional coordinate values of a tool command position as viewed from a coordinate system fixed to the workpiece, based on the second position command for each drive axis of the machine tool at each time and information on a machine configuration of the machine tool;
   a display color command unit which commands a predetermined display color corresponding to the status information output from the status information output unit; and
   a tool path display unit which displays a two- or three-dimensional path of the tool in the display color commanded by the display color command unit, based on the coordinate values of the tool command position calculated by the tool command position coordinate calculation unit, wherein
   the second position command calculation unit prepares a plurality of conditions for the speed restriction in advance, restricts the tangential speed of the tool so as to satisfy all the conditions, and converts the first position command into the second position command based on the restricted speed;
   the status information output unit restricts the tangential speed of the tool under one of the conditions and outputs status information indicative of the achievement of the conversion of the first position command into the second position command, corresponding individually to the conditions;
   the display color command unit previously sets display colors which correspond individually to the conditions, previously sets the order of priority of the status information output from the status information output unit, and commands the display colors in the set order of priority,
   whereby the condition under which the speed restriction on the tool is achieved is allowed to be determined by the color display at each point on the tool path.

2. The tool path display apparatus for a machine tool with a numerical controller according to claim 1, wherein the second position command calculation unit restricts the tangential speed of the tool so as to satisfy the previously specified condition and outputs the restricted tangential speed, and which further comprises a tangential speed display unit that simultaneously acquires a tangential speed and a status information at each time and displays the acquired tangential speed and the status information in waveforms, individually.

3. The tool path display apparatus for a machine tool with a numerical controller according to claim 2, further comprising:
   an actual tool position coordinate calculation unit which calculates two- or three-dimensional coordinate values of the tool as viewed from the coordinate system fixed to the workpiece, based on an actual position of each drive axis of the machine tool at each time and the information on the machine configuration;
   a path error calculation unit which calculates a path error of the tool based on the tool command position coordinate values calculated by the tool command position coordinate calculation unit and the actual tool position coordinate values calculated by the actual tool position coordinate calculation unit; and
   a waveform display unit which simultaneously displays the path error and the status signal at the same time in waveforms, individually.

* * * * *